US008169114B2

(12) United States Patent  (10) Patent No.: US 8,169,114 B2
Simon  (45) Date of Patent: May 1, 2012

(54) LARGE GAP HORIZONTAL FIELD MAGNETIC LEVITATOR

(76) Inventor: Martin Simon, Los Angeles, CA (US)

( * ) Notice: Subject to any disclaimer, the term of this patent is extended or adjusted under 35 U.S.C. 154(b) by 258 days.

(21) Appl. No.: 12/774,205

(22) Filed: May 5, 2010

(65) Prior Publication Data

US 2011/0273044 A1  Nov. 10, 2011

(51) Int. Cl.
*H02K 7/09* (2006.01)
(52) U.S. Cl. .................................. 310/90.5; 310/12.31
(58) Field of Classification Search .............. 310/90.5, 310/12.31
See application file for complete search history.

(56) References Cited

U.S. PATENT DOCUMENTS

| | | | |
|---|---|---|---|
| 2,691,306 A | 10/1954 | Beams | |
| 3,512,852 A * | 5/1970 | North | 310/90.5 |
| 4,040,681 A * | 8/1977 | van der Heide | 310/90.5 |
| 4,356,772 A * | 11/1982 | van der Heide | 104/282 |
| 4,382,245 A * | 5/1983 | Harrigan | 335/306 |
| 4,585,282 A * | 4/1986 | Bosley | 310/90.5 |
| 4,761,579 A * | 8/1988 | Delassus | 310/90.5 |
| 4,975,669 A * | 12/1990 | Wojtowicz | 335/216 |
| 5,168,183 A | 12/1992 | Whitehead | |
| 8,115,349 B2 * | 2/2012 | Mamba et al. | 310/12.31 |
| 2008/0123308 A1 | 5/2008 | Ryu et al. | |

OTHER PUBLICATIONS

Simon, Heflinger, and Geim, Diamagnetically Stabilized Magnetic Levitation, Journal, Jun. 2001, 702-713, 69-6, American Association of Physics Teachers.

* cited by examiner

*Primary Examiner* — Thanh Lam
(74) *Attorney, Agent, or Firm* — Marc E. Hankin; Kevin Schraven; Hankin Patent Law, APC

(57) ABSTRACT

The invention is a magnetic levitation device that has a pair of permanent magnets or electromagnets, which are used to create a large constant magnetic field on a horizontal plane between two magnetic poles. An object is levitated between the two magnets and is kept within the horizontal magnetic field by an electromagnet that is controlled by a servomechanism.

19 Claims, 3 Drawing Sheets

LARGE GAP HORIZONTAL FIELD MAGNETIC LEVITATOR

FIELD OF THE INVENTION

The present invention relates to magnetic levitation devices. More specifically, it relates to a magnetic levitator that creates a horizontal magnetic field between two magnetic poles and levitates a magnet between the two magnetic poles with an electromagnet that is controlled by a servomechanism.

BACKGROUND

Magnetic levitation devices generally use magnetic means such as permanent magnets or electromagnets to create a vertical magnetic field at the levitation position. The most common magnetic levitators since the 1950's have used a controllable electromagnet, or other strong magnet, positioned above a levitating object made from Ferromagnetic material. For example, U.S. Pat. No. 2,691,306, issued to Beams, discloses a device wherein the levitating object may be spun at high speed below an electromagnet. The device counters gravity by producing a ferromagnetic force. The force is variable in the vertical direction to stabilize the levitating object at the desired level.

Other similar devices involve novelties such as magnetically levitating world globes. U.S. Pat. No. 4,382,245, issued to Harrigan, discloses a naturally stable magnetic levitator wherein a floating, spinning magnet levitates above another, permanent magnet. U.S. Pat. No. 4,585,282, issued to Bosley, discloses a feedback levitator with magnets and controllable electromagnets below the levitating magnet. U.S. Pat. No. 5,168,183, issued to Whitehead, improved on Bosley by reducing the unstable plane to a single direction, which simplified the sensing and control. The Whitehead and Bosley devices allow a levitating magnet to float over a base magnet with the aid of controllable electromagnets.

United States Published Patent Application Number 2008/0122308, filed by Mleux, discloses position dependent control systems for a rotor or train car suspended in a vertical magnetic field created by magnetic structures above and below the levitated object. Lorentz forces between currents in fixed wires and magnets on the floater limit excursions of the floater between two positions around the equilibrium point. This requires narrow gaps between the structure and the levitated rotor.

These references share many common features, mainly which require the primary magnetic field created by the fixed magnets or electromagnet to be in the vertical or z-direction at the levitation point. Moreover, the poles of the floating, or induced magnet, are also in the vertical or z-direction. Finally, a gradient of the vertical or z-component of the magnetic field provides the lifting force against gravity. This usually requires the magnetic means to be located above and/or below the levitating object.

Academics have studied naturally stable levitation using diamagnetic materials. The journal article entitled, "Diamagnetically Stabilized Magnet Levitation," by Martin Simon, the named and sole inventor of the present invention, discloses a horizontally stable levitation device that uses diamagnetic materials and requires no additional energy input. Although effective, diamagnetic materials provide a very weak repelling force that decreases rapidly with distance and therefore must be located within a few millimeters of the levitating magnet. This method is not suitable for applications where there needs to be significant clear space around the levitated magnet platform or the magnet platform is operating in a closed or restricted cavity.

Thus, what is needed is a device that creates a magnetic field with the primary magnetic field in the horizontal direction at the levitation position, which will allow a magnetic means to be located in between the fixed magnets without a magnetic means above or below the levitating object, and without using diamagnetic materials to stabilize the levitating object.

SUMMARY OF THE INVENTION

To minimize the limitations in the prior art, and to minimize other limitations that will become apparent upon reading and understanding the present specification, the present invention relates to a device that levitates objects stably in all three directions using a horizontal magnetic field at the levitation position.

One embodiment of the invention is a magnetic levitating device comprising: a first magnetic element; a levitating magnetic element; one or more electromagnetic elements; a controller; a sensor; and a first support structure. The first magnetic element is mounted on the first support structure and creates a horizontal magnetic field. The horizontal magnetic field is on an x-axis relative to the first magnetic element. The levitating magnetic element is placed in the horizontal magnetic field and is levitated at an optimal levitation position within the horizontal magnetic field. The electromagnetic elements are positioned in such a way to allow them to stabilize the levitating magnetic element on the x-axis at an optimal levitation position. The controller is coupled to the one or more electromagnetic elements and to the sensor. The sensor senses an x-axis position of the levitating magnetic element, transmits the x-axis position of the levitating magnetic element to the controller, and the controller determines whether the x-axis position of the levitating magnetic element is at the optimal levitation position. If necessary, the controller sends a signal to the one or more electromagnetic elements to stabilize the levitating magnetic element along the x-axis and at the optimal levitation position.

Preferably, the levitating magnetic element within the horizontal magnetic field and at the optimal levitation position is stable on a y-axis relative to the first magnetic element and is stable on a z-axis relative to the first magnetic element. The horizontal magnetic field typically has a center symmetry that is determined by the size shape and number of magnetic elements, and the optimal levitation position is below the center symmetry. Preferably the first magnetic element is a permanent magnet, but it may be an electromagnet.

Preferably the magnetic levitating device further comprises: a second magnetic element. The second magnetic element is mounted on a second support structure and is disposed apart from the first magnetic element along the x-axis. The first magnetic element and the second magnetic element create the horizontal magnetic field between them and the optimal levitation position is half way between the first magnetic element and the second magnetic element. Preferably the second magnetic element is a permanent magnet, but it may be an electromagnet. The levitating magnetic element is preferably a neodymium permanent magnet, but it may be an electromagnet.

Preferably there are two first electromagnetic elements and they are mounted on the support structures. However, the electromagnetic elements may be placed in any position so long as they can keep the levitating magnetic element in place. Preferably the sensor is selected from the group consisting of a Hall Effect magnetic sensor, an optical sensor, and a wire coil sensor. It is also preferred that the controller is a servomechanism that controls the one or more electromagnetic elements using a feedback loop. The servomechanism controller is further comprised of a circuit and a power supply. After receiving input from the sensor, the circuit determines the difference between an actual position of the levitating magnetic element and the optimal levitation position, and based on the difference and the rate of change of the difference, the circuit causes the power supply to adjust a current to the one or more electromagnetic elements. The electromagnetic elements respond to the current and keep the levitating magnetic device at the optimal levitation position.

Another embodiment of the invention is a magnetic levitating device comprising: a first permanent magnet; a second permanent magnet; a levitating magnetic element; a first electromagnet; a second electromagnet; a controller; a sensor; and a support structure. The first permanent magnet and the second permanent magnet are mounted on the support structure apart from each other on a horizontal x-axis and they create a horizontal magnetic field between them. The horizontal magnetic field is on the x-axis relative to the first permanent magnet and the second permanent magnet. The levitating magnetic element is levitated at an optimal levitation position within the horizontal magnetic field and half way between the first permanent magnet and the second permanent magnet. The horizontal magnetic field has center symmetry and the optimal levitation position in a gravitational field is below the center symmetry. The levitating magnetic element within the horizontal magnetic field and at the optimal levitation position is stable on a y-axis relative to the first and second permanent magnets and is stable on a z-axis relative to the first and second permanent magnets. The first and second electromagnets are mounted apart on the support structure and are positioned to allow the first and second electromagnets to stabilize the levitating magnetic element on the x-axis at the optimal levitation position. The controller is coupled to the first and second electromagnets and to the sensor. The sensor senses an x-axis position of the levitating magnetic element and transmits the x-axis position of the levitating magnetic element to the controller. The controller, which is preferably a servomechanism that controls the first and second electromagnets through feedback, is comprised of a circuit and a power supply. The circuit determines a difference between an x-axis position of the levitating magnetic element and the optimal levitation position, and based on the difference and the rate of change of the difference, the circuit causes the power supply to adjust a current to the first and second electromagnets. The first and second electromagnets respond to the current and keep the levitating magnetic device at the optimal levitation position.

Another embodiment of the invention is a method of levitating a magnet comprising the steps of: providing a first magnetic pole on a support structure; providing a second magnetic pole on the support structure; wherein the first and second magnetic poles are aligned on a horizontal x-axis; creating a horizontal magnetic field between the first magnetic pole and the second magnetic pole; providing one or more electromagnetic elements; providing a levitating magnetic element; levitating the levitating magnetic element in an optimal levitating position within the horizontal magnetic field. Preferably the method also includes that the levitating magnetic element within the horizontal magnetic field is stable on a y-axis relative to the first and second magnetic poles and is stable on a z-axis relative to the first and second magnetic poles and the step of keeping the levitating magnetic element in place on the horizontal x-axis by the one or more electromagnetic elements. The method preferably further comprises the steps of: providing a sensor; providing a controller; wherein the controller is coupled to the sensor and to the one or more electromagnetic elements; wherein the controller is comprised of a circuit and a power supply; sensing an x-axis position of the levitating magnetic element; transmitting the x-axis position of the levitating magnetic element to a controller; determining by a circuit a difference between an x-axis position of the levitating magnetic element and the optimal levitation position; adjusting by the circuit of a current to the one or more electromagnetic elements from the power supply based on the difference and the rate of change of the difference; responding by the first and second electromagnetic elements to the current; and keeping the levitating magnetic device at the optimal levitation position in response to the current.

The present invention typically has two magnetic poles that are preferably comprised of permanent magnets. A magnetic field is created between the two poles and an object, typically another magnet, is levitated in the magnetic field.

Preferably, the magnetic poles are connected by a platform, or other type of support structure. The platform helps to maintain the proper height of the magnetic poles and the optimal distance between the poles to help shape the magnetic field. In other words, the platform creates the stationary connection between the magnetic poles to keep them the desired distance apart and at the right height and aligned and secondly, if the platform is made from or contains iron, the platform may aid in the magnetic flux from the back of one pole face around to the back of the other and may increase the magnetic field strength in the gap between the poles.

The electromagnetic elements provide stability control for the levitating object. Preferably, the electromagnetic elements are controlled by a sensor aided servomechanism that sends current to the electromagnetic elements to weaken or strengthen them as needed to keep the levitating object steady. The servomechanism provides for time dependent feedback to the electromagnets. The servo controlled electromagnets may be placed anywhere on the levitating device, so long as they are able to keep the levitating object steady, but they are preferably positioned with the permanent magnets that provide the horizontal magnetic field.

When the levitating object starts to slip out of the desired position, a sensor senses the movement, transmits the movement to the controller and the controller sends a signal to the electromagnetic elements, which react to keep the levitating object centered in place.

The servo preferably includes two parts. The first part is an analog or digital circuit or chip or computer that takes the difference between the actual position and the desired position and the rate of change of this "error." The second part is a power supply, which depending on feedback from the controller, alters the current to one or more electromagnets to keep the floating magnet at the desired location.

In another embodiment of the device, the magnetic poles can be electromagnets with constant currents, instead of permanent magnets. This embodiment may use a separate set of electromagnets that can supply the control magnetic fields or a single set of electromagnets could create a steady current with an added feedback control current. Then the steady current and feedback control current can be delivered by the same pair of electromagnets.

In another embodiment of this device, the magnetic levitator can actively cool the coils or employ superconducting magnets to increase the gap between the levitating object, the electromagnets, and the permanent magnet.

The present invention is vastly improved over the prior art because it does not require a vertical levitation field, permanent magnet, or a controlling electromagnet directly above or below the levitating magnet. The poles of the levitating magnet of the present invention are not on a vertical axis, but instead on a horizontal axis. The permanent magnets and electromagnets are arranged on a horizontal axis and produce an essentially horizontal magnetic field at the levitation position.

The advantage of this device is that no magnet or structure needs to be above or below or very near the levitating object. Rather, the magnetic means are off to the sides allowing clear space above and below. This is important when the levitator is part of a system that requires other parts or apparatuses to occupy the region above and/or below the levitating object. The horizontal levitation device of the present invention also allows a large gap in the horizontal direction between the fixed magnetic elements and the levitating object. This is important in applications that require this space to be free of any structure related to the levitation or where a large separation between the levitating object and the static and electromagnetic control fields is necessary or desirable.

Additionally, the levitating object can be controlled for precise movement at high speeds without mechanical vibrations. When the levitating object is not just an object, but may include means to etch a piece of metal or perform medical operations, the servomechanism can precisely move the levitating object in three dimensions. The present invention may also be used as part of a vibration isolation system, gravity sensor, accelerometer, seismometer, magnetic field sensor and/or remote contactless actuator.

Another advantage of this magnetic levitator is that a levitating object with a horizontal symmetry axis may be rotated with very little friction and a large, clear space between the static and electromagnetic control fields. The magnetic levitator of the present invention preferably has a very efficient way to create the magnetic field with coils and can increase the gap between the levitating object and the control fields with superconducting magnets or a system to actively cool the coils.

It is an object of the present invention to overcome the limitations of the prior art.

DETAILED DESCRIPTION OF THE DRAWINGS

In the following detailed description of the preferred embodiment, reference is made to the accompanying drawings that form a part hereof, and in which is shown, by way of illustration, a specific embodiment in which the invention may be practiced. It is to be understood that other embodiments may be utilized and structural changes may be made without departing from the scope of the present invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

The sensor of the present invention senses the position of the levitating magnetic element and the controller adjusts an electric current to one or more electromagnets to move the levitating magnetic element to a desired position. The sensor and controller combination provides for a real time feedback that can be used to detect unwanted motion of the levitating magnetic element and ensure accuracy of the commanded current.

Preferably, the permanent magnet used as the levitating magnetic element is a neodymium magnet (also known as NdFeB, NIB, or Neo magnet). A neodymium magnet, which is a type of rare-earth magnet, is composed of an alloy of neodymium, iron, boron, and a few transition metals to form the Nd2Fe14B tetragonal crystalline structure. A neodymium magnet is recognized as one of the strongest permanent magnets available and it is cost effective enough to be commercially viable when used with the present invention, and can bear sufficient weight when the levitating object needs to carry additional materials.

The term Hall Effect, as used herein, is the production of a voltage difference (the Hall voltage) across an electrical controller. The electrical current traverses the controller to generate a vertical magnetic field that is perpendicular to the existing horizontal magnetic field created by the first magnetic element. Edwin Hall discovered this effect in 1879 and the Hall Effect is well known in the art.

The term "optical sensor" includes all types of visual and optical sensors, including a video camera with a connected computer.

Figure 1:
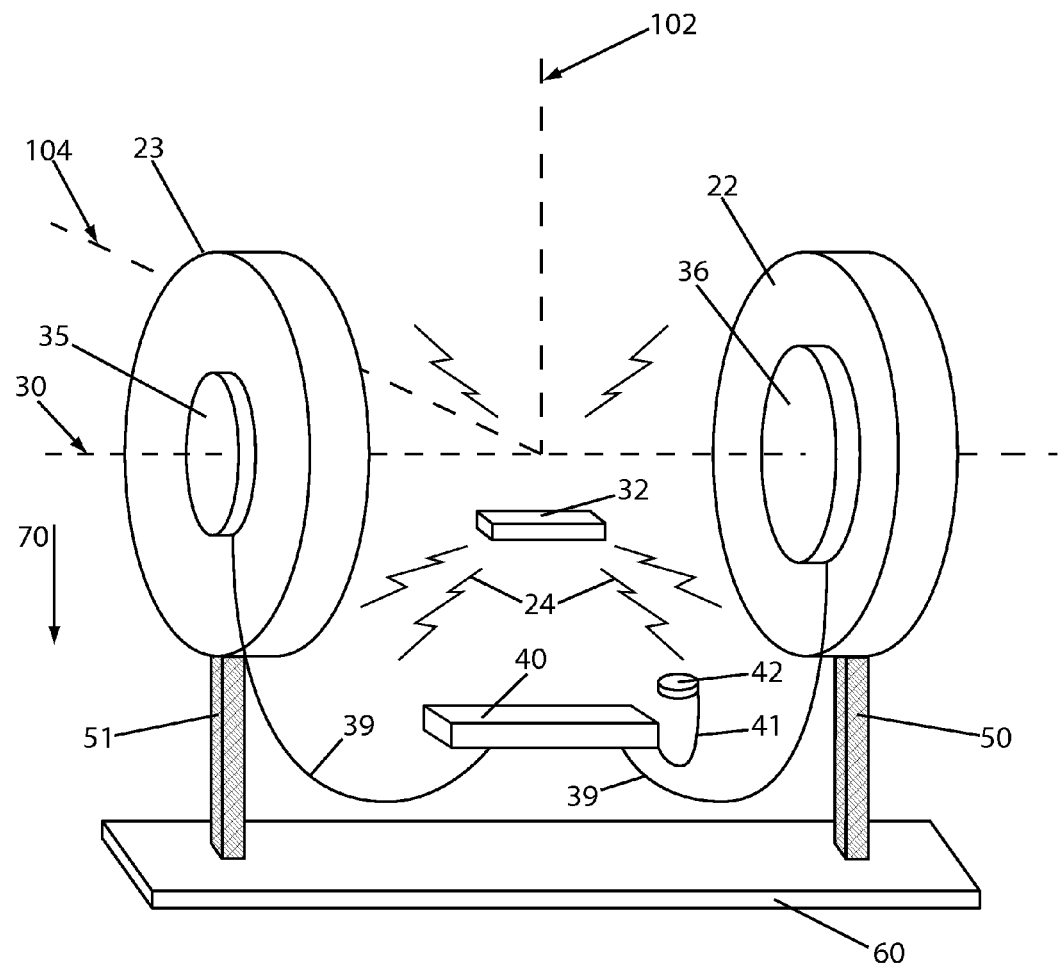
FIG. 1 is an illustration of a perspective view of one embodiment of the magnetic levitator.

FIG. 1 is an illustration of a perspective view of one embodiment of the magnetic levitator. As shown in FIG. 1, the magnetic levitator preferably includes magnetic elements 22 and 23, which are preferably permanent magnets that create a horizontal magnetic field 24 on a horizontal x-axis 30. The magnetic levitator also preferably includes a levitating magnetic element 32, electromagnet elements 35 and 36, wires 39, controller 40, sensor wire 41, sensor 42, support structures 50 and 51, and base 60. Although the horizontal magnetic field 24 is shown as being created by two magnetic elements 22 and 23, it should be understood that such a magnetic field can be created by as few as one magnet or as many as any number of magnets. It is also possible to create magnetic field 24 with one or more electromagnets without deviating from the scope of the invention. The electromagnets would be powered such that they generate a large constant magnetic field.

As shown in FIG. 1, the levitating magnetic element 32 is preferably levitated within magnetic field 24. The levitating magnetic element 32, when levitating, is naturally stable within the magnetic field 24 along the y-axis 104 and vertical z-axis 102. However, the magnetic element 32 is not stable along the horizontal x-axis 30. The electromagnets 35, 36 are preferably positioned to allow one or more electromagnetic elements to stabilize the levitating magnetic element 32 on the x-axis 30 at an optimal levitation position. Although the levitating device preferably has two electromagnets 35 and 36 to stabilize the levitating magnetic element 32, it should be understood that as few as one electromagnet may be used or as many as any number of electromagnets. FIG. 1 also shows how the optimal levitation position for the levitating magnetic element 32 is between magnetic elements 22 and 23 and slightly below center symmetry of the horizontal axis when a force such as gravity is present. The arrow 70 shows the downward direction of gravity that is pulling on magnetic element 32.

FIG. 1 shows that electromagnets 35 and 36 are coupled to the controller 40 and that the controller 40 and sensor 42 are coupled together. Although the coupling between the electromagnets 35 and 36 and the controller 40 are shown as wires 39, and the coupling between controller 40 and sensor 42 are shown as sensor wire 41, it should be understood that the coupling may be wireless without deviating from the scope of the invention. A hard wired coupling allows for consolidation of the power source for the electromagnets 35 and 36, controller 40, and sensor 42. If a wireless coupling or communication means is used, then the sensor 42, controller 40, and electromagnets 35 and 36 may be powered by battery.

FIG. 1 also shows how electromagnets 35 and 36 are preferably mounted on magnetic elements 22 and 23. In this manner, the levitating magnetic element 32 may be easily and efficiently stabilized by electromagnets 35 and 36. Electromagnets 35 and 36 may, however, be positioned anywhere near, on, or within magnetic elements 22 and 23, so long as they are able to stabilize levitating magnetic element 32.

As shown in FIG. 1, magnetic elements 22 and 23 are preferably mounted on support structures 50 and 51. Support structures 50 and 51 preferably hold the magnetic elements 22 and 23 firmly and provide for a stable magnetic field 24. Although the first support structures 50 and 51 are shown as two posts attached to the bottom of magnetic elements 22 and 23, it should be understood that the support structures may be any size or shape, may be attached to magnetic elements 22 and 23 from any direction and through any means, and may even be part of the magnetic elements 22 and 23 themselves. The support structures 50 and 51 are preferably attached securely to base 60 and base 60 is preferably made of steel or iron so that it enhances the horizontal magnetic field 24. Although base 60 is shown below the magnetic field 24, the base 60 may be located to the side or above the magnetic field 24 without deviating from the scope of the invention.

Sensor 42 preferably senses the position of the levitating magnetic element 32 along the horizontal x-axis 30 within the horizontal magnetic field 24. The sensor 42 then preferably transmits (via wire or wireless) the sensed position of the levitating magnetic element 32 to the controller 40. The controller 40 preferably determines whether the sensed position of the levitating magnetic element 32 is at the optimal levitating position. If the controller 40 determines that the levitating magnetic element 32 is not in the optimal levitating position, the controller 40 will selectively send a signal to electromagnets 35 and 36 to adjust the position of the levitating magnetic element 32 along the x-axis 30.

The controller 40 is preferably a servomechanism controller. The controller 40 is preferably comprised of a circuit, chip, or other type of computerized controller, and a power supply. Preferably the circuit determines the difference between the actual position of the levitating magnetic element 32 and the optimal levitation position along the x-axis 30 and the rate of change of the difference. Based on the difference and rate of change, if any, the circuit causes the power supply to adjust a power current to electromagnets 35 and 36. One or both of the electromagnets 35 and 36 respond to the current from the power supply, which causes an adjustment to the horizontal position of the levitating magnetic element 32.

Although the sensor 42 is shown adjacent to the controller 40 and below the magnetic field 24, sensor 42 may be located on or within: magnetic elements 22 and/or 23; support structures 50 and/or 51; levitating magnetic element 32; or at any other location so long as sensor 42 can sense the location of the levitating magnetic element 32 in relation to the optimal levitating position.

Figure 2:
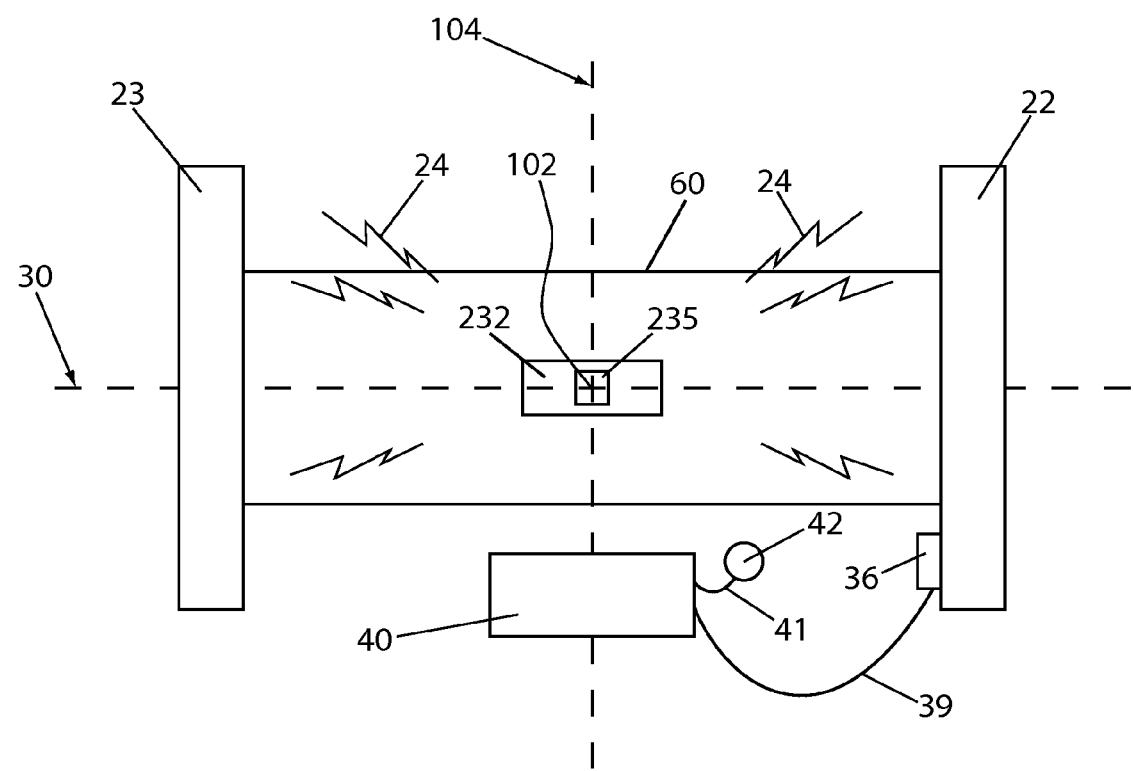
FIG. 2 is an illustration of a top view of one embodiment of the magnetic levitator.

FIG. 2 is an illustration of a top view of one embodiment of the magnetic levitator. As shown in FIG. 2, the magnetic levitator preferably includes magnetic elements 22 and 23, which are preferably permanent magnets that create a horizontal magnetic field 24 on a horizontal x-axis 30. The magnetic levitator also preferably includes electromagnet element 36, wire 39, controller 40, sensor wire 41, sensor 42, base 60, levitating object 232, and levitating magnetic element 235. The horizontal magnetic field 24 levitates levitating magnetic element 32 stably along the y-axis 104 and vertical z-axis 102. Vertical z-axis is only seen as a point in FIG. 2 because it is coming straight up from the center of the levitating magnetic element 32.

FIG. 2 shows how the electromagnetic element 36, which stabilizes levitating object 232, may be positioned off center with respect to magnetic elements 22 and 23. FIG. 2 also shows how base 60 runs parallel with the horizontal magnetic field 24 to enhance the magnetic field 24.

FIG. 2 also shows how the levitating magnetic element 235 may be incorporated with or otherwise supporting a levitating object 232. If levitating magnetic element 235 is a strong enough permanent or electromagnet, than it can support a substantial load of weight. Although levitating magnetic element 235 is shown without a power source, it should be understood that if magnetic element 235 is an electromagnet, it may be operated by battery or by a power supply, via a power cord.

The poles of the magnetic elements are typically aligned. For example, the following sides of the magnets may be NORTH poles: the outside part of magnetic element 23, the inside part of magnetic element 22, and the left side of magnetic element 235. Whereas the following sides may be SOUTH poles: the inside part of magnetic element 23, the outside part of magnetic element 22, and the right side of magnetic element 235. In this manner a strong and consistent magnetic field 24 may be generated.

Figure 3:
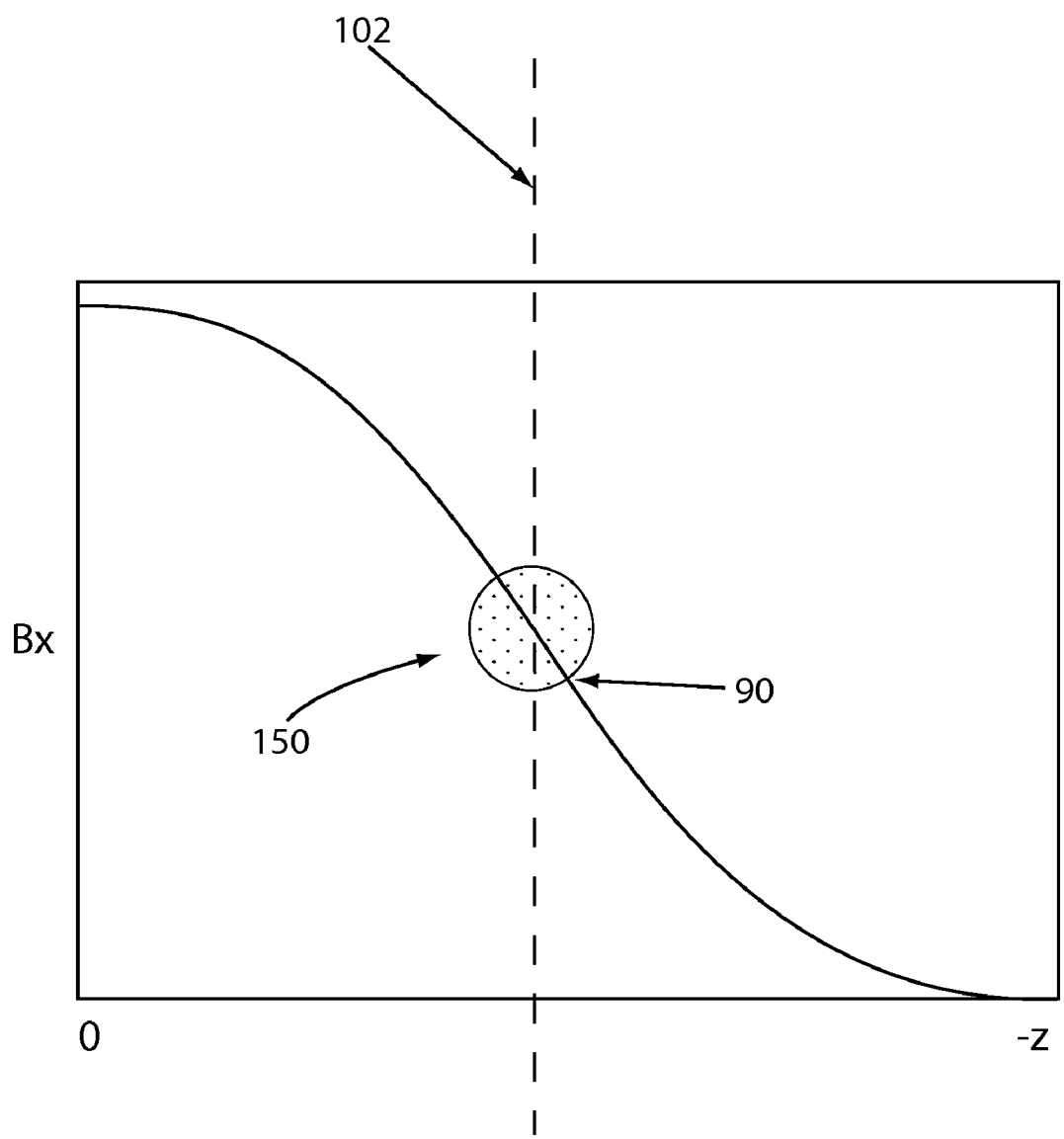
FIG. 3 is a graph of the horizontal magnetic field midway between the two magnetic poles as a function of the distance below the centerline for one embodiment of the magnetic levitator.

FIG. 3 is a graph of the horizontal magnetic field midway between the two magnetic poles as a function of the distance below the centerline for one embodiment of the magnetic levitator. The preferred location for the levitating magnetic element 32 (as shown in FIGS. 1 and 2) is stable along the z-axis within the levitation region 150 and above the inflection point 90 where the curvature of the magnetic field is negative. The gradient of the magnetic field, the slope of the graph at 90, must be greater than $mg/\mu$, the weight of the magnet divided by its magnetic moment ($\mu$), which is a measure of its magnetic strength. $mg/\mu$ is a material property of the floating magnet. If the magnet has a non-magnetic load, then the weight $mg$ increases, and the magnet strength $\mu$ remains constant. The $B_x$ graph is related to the magnetic potential energy MPE, where $B_x = -MPE/\mu$. Within the $B_x$ graph, the abscissa ranges from 0 to $-z$ as the distance below the centerline connecting the two magnetic poles (as shown in FIGS. 1 and 2). FIG. 3 shows a levitation position on the vertical z-axis 102 which has a $-z$ value, where $z$ is the distance below the centerline and where the gradient $\partial B_x/\partial z = mg/\mu$ for a typical floating element.

In summary, the present invention is large gap horizontal magnetic levitator that uses a servomechanism to provide stability with no structure required above or below the levitation position.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A magnetic levitating device comprising:
   a first magnetic element;
   a levitating magnetic element;
   one or more electromagnetic elements;
   a controller;
   a sensor; and
   a first support structure;
   wherein said first magnetic element is mounted on said first support structure;
   wherein said first magnetic element creates a horizontal magnetic field;
   wherein said horizontal magnetic field is on an x-axis relative to said first magnetic element;
   wherein said levitating magnetic element is levitated at an optimal levitation position within said horizontal magnetic field;
   wherein said one or more electromagnetic elements are positioned to allow said one or more electromagnetic elements to stabilize said levitating magnetic element on said x-axis at said optimal levitation position;
   wherein said controller is coupled to said one or more electromagnetic elements and to said sensor;
   wherein said sensor senses an x-axis position of said levitating magnetic element;
   wherein said sensor transmits said x-axis position of said levitating magnetic element to said controller;
   wherein said controller determines whether said x-axis position of said levitating magnetic element is at said optimal levitation position;
   wherein said controller selectively sends a signal to said one or more electromagnetic elements to stabilize said levitating magnetic element along said x-axis and at said optimal levitation position.

2. The magnetic levitating device of claim 1, wherein said levitating magnetic element within said horizontal magnetic field and at said optimal levitation position is stable on a y-axis relative to said first magnetic element and is stable on a z-axis relative to said first magnetic element.

3. The magnetic levitating device of claim 2, wherein said horizontal magnetic field has a center symmetry; and
   wherein said optimal levitation position is below said center symmetry when the force of gravity is in a negative z-direction.

4. The magnetic levitating device of claim 3, wherein said first magnetic element is a permanent magnet.

5. The magnetic levitating device of claim 3, wherein said first magnetic element is an electromagnet.

6. The magnetic levitating device of claim 3, further comprising:
   a second magnetic element;
   wherein said second magnetic element is mounted on a second support structure;
   wherein said second magnetic element and said first magnetic element are disposed apart on said x-axis;
   wherein said horizontal magnetic field is between said first magnetic element and said second magnetic element;
   wherein said optimal levitation position is half way between said first magnetic element and said second magnetic element.

7. The magnetic levitating device of claim 6, wherein said second magnetic element is a permanent magnet.

8. The magnetic levitating device of claim 6, wherein said second magnetic element is an electromagnet.

9. The magnetic levitating device of claim 3, wherein said levitating magnetic element is a permanent magnet.

10. The magnetic levitating device of claim 9, wherein said levitating magnetic element is a neodymium magnet.

11. The magnetic levitating device of claim 6, wherein there are two electromagnetic elements, a first said electromagnetic element and a second electromagnetic element.

12. The magnetic levitating device of claim 11, wherein said first electromagnetic element is mounted on said first support structure and wherein said second electromagnetic element is mounted on said second support structure.

13. The magnetic levitating device of claim 3, wherein said sensor is selected from the group consisting of a Hall Effect magnetic sensor, an optical sensor, and a wire coil sensor.

14. The magnetic levitating device of claim 3, wherein said controller is a servomechanism that controls said one or more electromagnetic elements using feedback.

15. The magnetic levitating device of claim 14, wherein said servomechanism controller is further comprised of a circuit and a power supply;
    wherein said circuit determines a difference between an actual position of said levitating magnetic element and said optimal levitation position, and based on said difference, said circuit causes said power supply to adjust a current to said one or more electromagnetic elements;
    wherein said one or more electromagnetic elements respond to said current and keep said levitating magnetic device at said optimal levitation position.

16. A magnetic levitating device comprising:
    a first permanent magnet;
    a second permanent magnet;
    a levitating magnetic element;
    a first electromagnet;
    a second electromagnet;
    a controller;
    a sensor; and
    a support structure;
    wherein said first permanent magnet and said second permanent magnet are mounted on said support structure apart from each other on a horizontal x-axis;
    wherein said first permanent magnet and said second permanent magnet create a horizontal magnetic field between them;
    wherein said horizontal magnetic field is on said x-axis relative to said first permanent magnet and said second permanent magnet;
    wherein said levitating magnetic element is levitated at an optimal levitation position within said horizontal magnetic field and half way between said first permanent magnet and said second permanent magnet;
    wherein said horizontal magnetic field has a center symmetry;
    wherein said optimal levitation position is below said center symmetry;

wherein said levitating magnetic element within said horizontal magnetic field and at said optimal levitation position is stable on a y-axis relative to said first and second permanent magnets and is stable on a z-axis relative to said first and second permanent magnets;

wherein said first and second electromagnets are mounted apart on said support structure and are positioned to allow said first and second electromagnets to stabilize said levitating magnetic element on said x-axis at said optimal levitation position;

wherein said controller is coupled to said first and second electromagnets and to said sensor;

wherein said sensor senses an x-axis position of said levitating magnetic element;

wherein said sensor transmits said x-axis position of said levitating magnetic element to said controller;

wherein said controller is a servomechanism that controls said first and second electromagnets using feedback;

wherein said servomechanism controller is further comprised of a circuit and a power supply;

wherein said circuit determines a difference between an x-axis position of said levitating magnetic element and said optimal levitation position, and based on said difference, said circuit causes said power supply to adjust a current to said first and second electromagnets; and wherein said first and second electromagnets respond to said current and keep said levitating magnetic device at said optimal levitation position.

17. A method of levitating a magnet comprising the steps of:

providing a first magnetic pole on a support structure;

providing a second magnetic pole on said support structure;

wherein said first and second magnetic poles are aligned on a horizontal x-axis;

creating a horizontal magnetic field between said first magnetic pole and said second magnetic pole;

providing one or more electromagnetic elements;

providing a levitating magnetic element;

levitating said levitating magnetic element in an optimal levitating position within said horizontal magnetic field.

18. The method of levitating a magnet of claim 17, wherein said levitating magnetic element within said horizontal magnetic field is stable on a y-axis relative to said first and second magnetic poles and is stable on a z-axis relative to said first and second magnetic poles;

keeping said levitating magnetic element in place on said horizontal x-axis by said one or more electromagnetic elements.

19. The method of levitating a magnet of claim 17, further comprising the steps of:

providing a sensor;

providing a controller;

wherein said controller is coupled to said sensor and to said one or more electromagnetic elements;

wherein said controller is comprised of a circuit and a power supply;

sensing an x-axis position of said levitating magnetic element;

transmitting said x-axis position of said levitating magnetic element to a controller;

determining by a circuit a difference between an x-axis position of said levitating magnetic element and said optimal levitation position;

adjusting by said circuit of a current to said one or more electromagnetic elements from said power supply based on said difference;

responding by said first and second electromagnetic elements to said current; and keeping said levitating magnetic device at said optimal levitation position in response to said current.

* * * * *